United States Patent
Wootten (10) Patent No.: US 8,800,384 B2
(45) Date of Patent: Aug. 12, 2014

(54) CANTED HELIX COLLAPSIBLE FLOWMETER AND METHOD OF MEASURING A FLUID FLOW

(75) Inventor: Keith Robert Wootten, Reading (GB)

(73) Assignee: Sondex Wireline Limited, Yately, Hampshire (GB)

( * ) Notice: Subject to any disclaimer, the term of this patent is extended or adjusted under 35 U.S.C. 154(b) by 842 days.

(21) Appl. No.: 12/974,019

(22) Filed: Dec. 21, 2010

(65) Prior Publication Data

US 2012/0158308 A1 Jun. 21, 2012

(51) Int. Cl.
*G01F 1/28* (2006.01)
*G01F 1/05* (2006.01)
*E21B 47/10* (2012.01)

(52) U.S. Cl.
USPC .............. 73/861.75; 73/861.79; 73/152.21; 73/152.34

(58) Field of Classification Search
None
See application file for complete search history.

(56) References Cited

U.S. PATENT DOCUMENTS

| | | | | |
|---|---|---|---|---|
| 2,709,075 A | * | 5/1955 | August | 366/38 |
| 3,630,078 A | * | 12/1971 | Bonnet | 73/152.35 |
| 4,345,480 A | * | 8/1982 | Basham et al. | 73/861.77 |
| 4,481,020 A | * | 11/1984 | Lee et al. | 96/214 |
| 4,500,259 A | | 2/1985 | Schumacher | |
| 5,251,479 A | * | 10/1993 | Siegfried et al. | 73/152.29 |
| 6,125,934 A | * | 10/2000 | Lenn et al. | 166/250.12 |
| 7,114,386 B1 | * | 10/2006 | Veignat et al. | 73/152.29 |
| 8,505,376 B2 | * | 8/2013 | Ross | 73/152.29 |
| 2009/0257849 A1 | * | 10/2009 | Oliveira et al. | 414/160 |
| 2012/0011928 A1 | * | 1/2012 | Wootten | 73/152.29 |
| 2012/0285233 A1 | * | 11/2012 | Maute | 73/152.29 |
| 2013/0081459 A1 | * | 4/2013 | Memiche | 73/152.29 |

FOREIGN PATENT DOCUMENTS

| | | |
|---|---|---|
| WO | 9744567 A1 | 11/1997 |
| WO | 0111190 A1 | 2/2001 |

OTHER PUBLICATIONS

EP Search Report and Written Opinion dated Jan. 28, 2014 from corresponding Application No. 11192518.6.

* cited by examiner

*Primary Examiner* — Harshad R Patel
(74) *Attorney, Agent, or Firm* — Global Patent Operation (57) ABSTRACT

Flowmeters and methods of measuring a fluid flow or manufacturing flowmeters are presented. A flowmeter has a tool body and one or more spinner arms configured to extend with a first end away from the tool body and a second end joined to the tool body, when deployed to measure a fluid flow. Each spinner arm includes a helical blade configured to rotate due to a fluid flowing substantially parallel to a longitudinal axis of the tool body, around a rotation axis between the first end and the second end.

18 Claims, 7 Drawing Sheets

CANTED HELIX COLLAPSIBLE FLOWMETER AND METHOD OF MEASURING A FLUID FLOW

BACKGROUND

1. Technical Field

Embodiments of the subject matter disclosed herein generally relate to a canted helix flowmeter including a spinner arm configured to be deployed at a predetermined angle with a fluid flow direction and having helical blades.

2. Discussion of the Background

Since oil and gas remain a source of energy that cannot be replaced at a significant enough proportion in the world economy, the interest in developing new production fields has continued to increase, in spite of the harsher conditions in terms of accessibility and safety of exploitation. Thus, oil wells are developed undersea and flow measurements inside the well are often desirable.

A flow measurement quantifies an amount of a moving fluid. In gas and oil wells, local or systematic variations of the fluid flow render the flow measurement more challenging. For example, when a multiphase fluid flow is measured in an inclined pipe (even for small inclinations) a phase segregation may occur, when lighter phases migrate to a high side (in a plane perpendicular to the flow direction) of the well, while heavier phases migrate to a low side of the well. Locally or related to different phases mixed in the fluid, the fluid may have different velocities or even flow in different directions.

Figure 1:
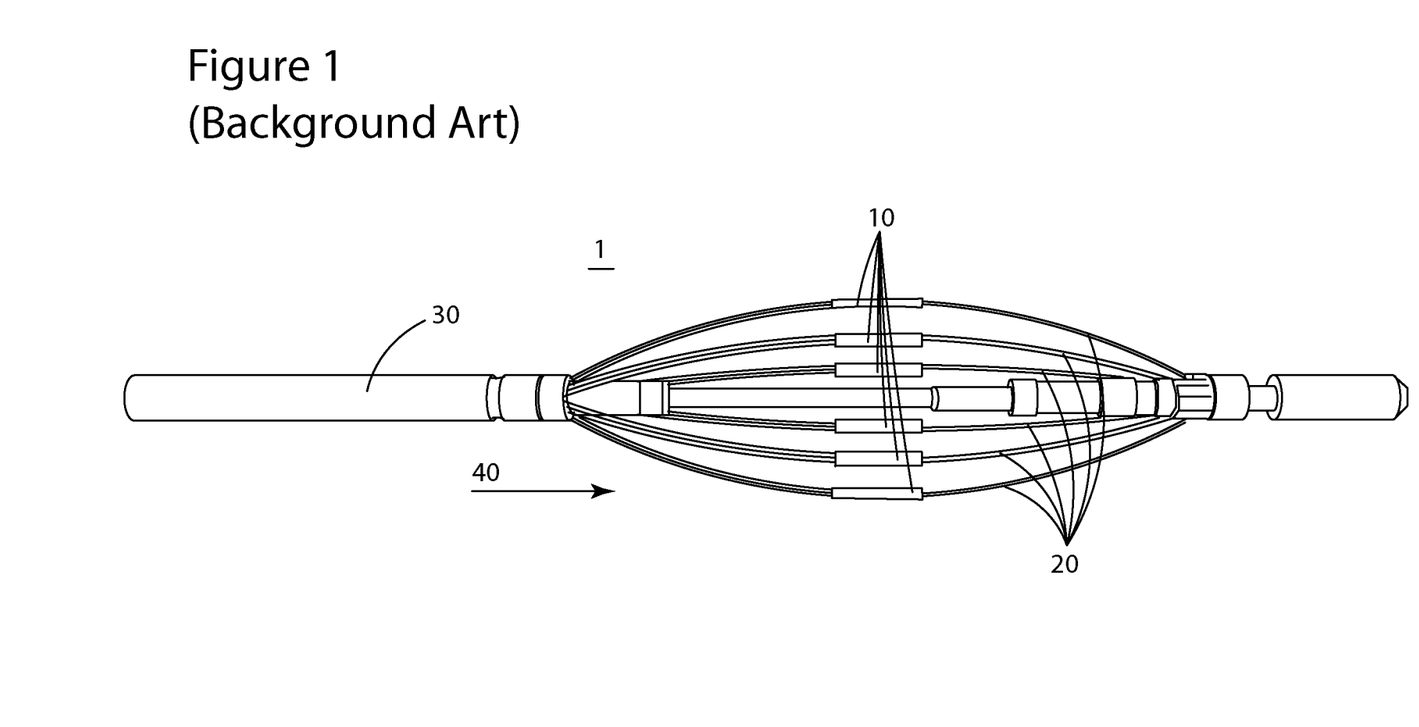
FIG. 1 is a schematic diagram of a spinner tool array.

A conventional tool used to measure a fluid flow in a borehole is a spinner tool array 1 illustrated in FIG. 1. The spinner tool array 1 includes six flow sensors 10 attached to bowspring arms 20 that emerge from a tool body 30. The bowspring arms 20 are retracted inside the tool body 30 during transportation through a restriction to a measurement location inside the borehole. The sensors 10 are deployed to be parallel to a fluid flow direction 40, at different locations away from the tool body's central position, up to edges of the borehole.

Figure 2:
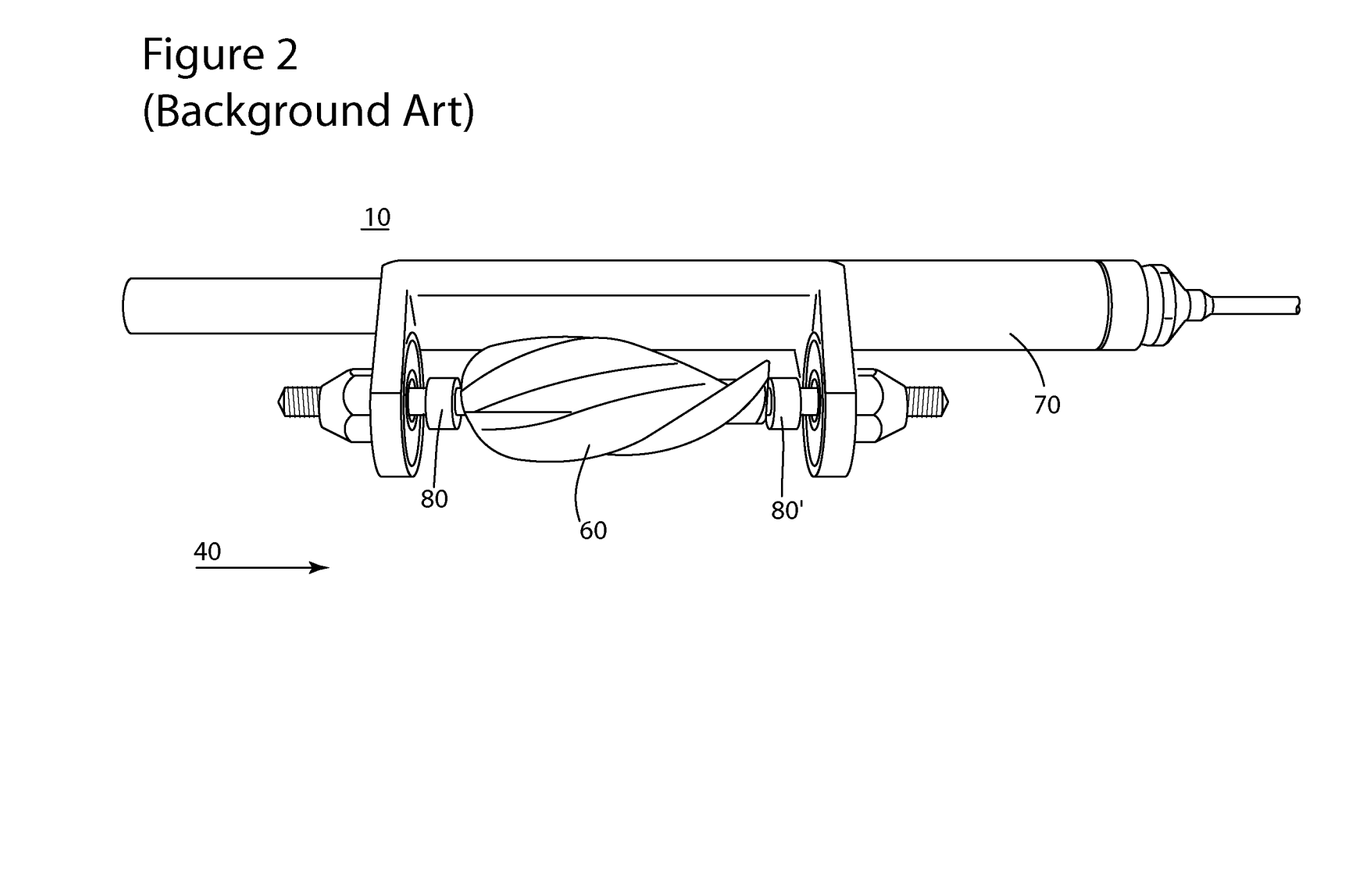
FIG. 2 is a schematic diagram of a flow sensor of the spinner tool array.

FIG. 2 illustrates a flow sensor 10 of the spinner tool array 1. The flow sensor 10 includes an impeller 60 of about 9 mm diameter and about 25 mm length. The impeller 60 spins like a mini-turbine due to the fluid flow. In order to be able to spin, the impeller 60 is mounted on a holding structure 70 via bearings 80 and 80'. The rotation speed of the impeller 60 depends on the speed of the fluid. The fluid flow is calculated based on the rotation speed of the impeller 60. The rotation speed may be measured, for example, by measuring an electromagnetic signal generated by small magnets that are embedded in the impeller 60. The generated signal may be picked-up by an appropriate device located inside the holding structure 70.

A problem observed in using the spinner tool array 1 inside an oil and gas well is the clogging of the bearings 80 and 80' with dirt or other particles. When the bearings 80 and 80' are clogged, a friction in the bearings increases, and the rotation speed of the impeller 60 decreases (sometimes down to zero). Thus, the spinner tool array 1 does not provide a reliable flow measurement in an oil and gas well, due to the vulnerability of the flow sensors to the environment.

Additionally, one of the bearings (e.g., 80 in FIG. 2) and a part of the holding structure 70 are disposed in the path of the fluid flow, before the impeller 60 (the other bearing is located after the impeller 60), thus partially blocking the fluid flow moving towards the impeller 60. This arrangement affects the accuracy of the flow measurement using the spinner tool array 1.

Accordingly, it would be desirable to provide systems and methods that avoid the afore-described problems and drawbacks.

SUMMARY

According to one exemplary embodiment, a flowmeter includes a tool body, one or more spinner arms and a helical blade mounted on each of the helical arms. The one or more spinner arms are configured to extend with a first end away from the tool body and have a second end joined to the tool body, when deployed to measure a fluid flow. The helical blade is configured to rotate due to a fluid flowing substantially parallel to a longitudinal axis of the tool body, around a rotation axis extending along the spinner arm on which the helical blade is mounted, between the first end and the second end.

According to another exemplary embodiment, a method of measuring a fluid flow includes deploying, at a predetermined angle with a flow direction, of one or more spinner arms including helical blades, each of the helical blades being configured to rotate around a rotation axis at the respective predetermined angle, and measuring rotating speeds of the helical blades.

According to another exemplary embodiment, a method of manufacturing a flowmeter includes mounting a helical blade on each of one or more spinner arms, the helical blade being able to rotate due to a fluid flowing at one or more predetermined angles with a rotation axis that extends along the spinner arm. The method of manufacturing further includes joining a first end of the one or more spinner arms to a tool body, the one or more spinner arms being configured (i) to extend with a second end away from the tool body, and (ii) to collapse with the second end close to the tool body.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a flowmeter used in oil and gas wells. However, the embodiments to be discussed next are not limited to these systems, but may be applied to other systems that may be used for measuring a fluid flow.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
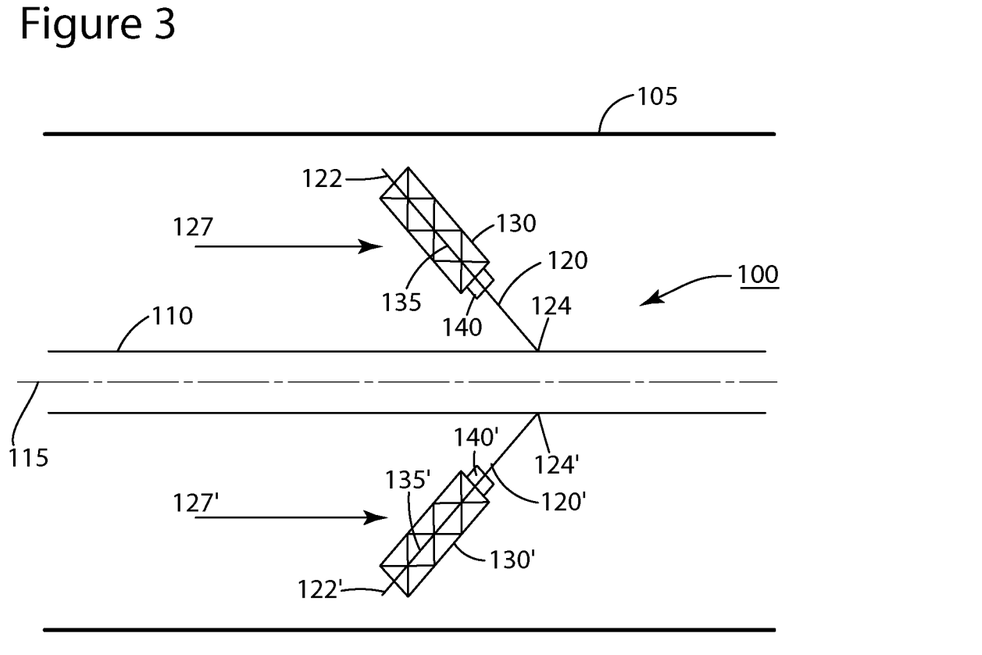
FIG. 3 is a schematic diagram of a canted helix collapsible flowmeter according to an exemplary embodiment.

According to an exemplary embodiment, FIG. 3 is a schematic diagram of a canted helix collapsible flowmeter 100 deployed inside a borehole casing 105. The flowmeter 100 has a tool body 110 with a longitudinal axis 115, and two spinner arms 120 and 120'. Other embodiments may have one or more than two spinner arms.

The spinner arms 120 and 120' are configured to be folded (not shown) around or inside the tool body 110, while the flowmeter 100 is transported through a restricted passage, to a measurement location. At the measurement location, the spinner arms 120 and 120' are deployed (as shown in FIG. 3) substantially symmetric relative to the tool body 110, to extend with one end 122 or 122' away from the tool body 110, and another end 124 or 124' joined to the tool body 110. In FIG. 3, the spinner arms 120 and 120' are each deployed at an angle of about 45° with the longitudinal axis 115 of the tool body 110. However, the spinner arms may be deployed at other angles. A flow direction of the fluid in the casing, which is represented by arrows 127 and 127', is substantially parallel with the longitudinal axis 115 of the tool body 110. This manner of deploying the spinner arms 120 and 120' has the effect that the fluid flow exerts larger torques on the helical blades 130 and 130' than for a sensor 10 of the spinner array tool 1 in FIG. 1, which is deployed along the fluid flow.

Each spinner arm 120 and 120' includes a helical blade 130 and 130', respectively. The helical blades 130 and 130' may be located closer to the one end 122 or 122' than to the other end 124 or 124' of the spinner arm 120 or 120'.

The helical blades 130 and 130' are configured to rotate due to a fluid flowing substantially parallel to the longitudinal axis 115 of the tool body 110. A rotation axis 135 or 135' of the helical blades 130 or 130', respectively, is an axis along the spinner arm 120 or 120', between the one end 122 or 122', and the other end 124 or 124'.

Sensors 140 and 140' are configured to measure rotating speeds of the helical blades 130 and 130', respectively, and are located on each of the spinner arms 120 and 120', outside an area of a respective helical blade 130 or 130'. In contrast with the spinner tool array 1 where a bearing 80 and an associated part of the holding structure 70 partially block the flow because they are located in front of the impeller 60 in the flow direction, the flowmeter 100 includes no component that would be an obstacle before the helical blades 130 and 130' in the flow direction 127 or 127'.

The sensors 140 and 140' may transmit the measured rotating speeds wirelessly or via a wire to a data processing unit that estimates the fluid flow based on the transmitted information. The data processing unit may be located inside the tool body 110 or remote, independent of a location of the canted helix collapsible flowmeter 100.

The helical blades 130 and 130' may have one or more helices. A preferred embodiment has two helices (i.e., the helical blade is a double helix). The helical blades 130 and 130' may have a diameter of about 10 mm and a length of about 50 mm. The helical blades may be twisted to have, for example, a helical angle of about 45°.

Figure 4:
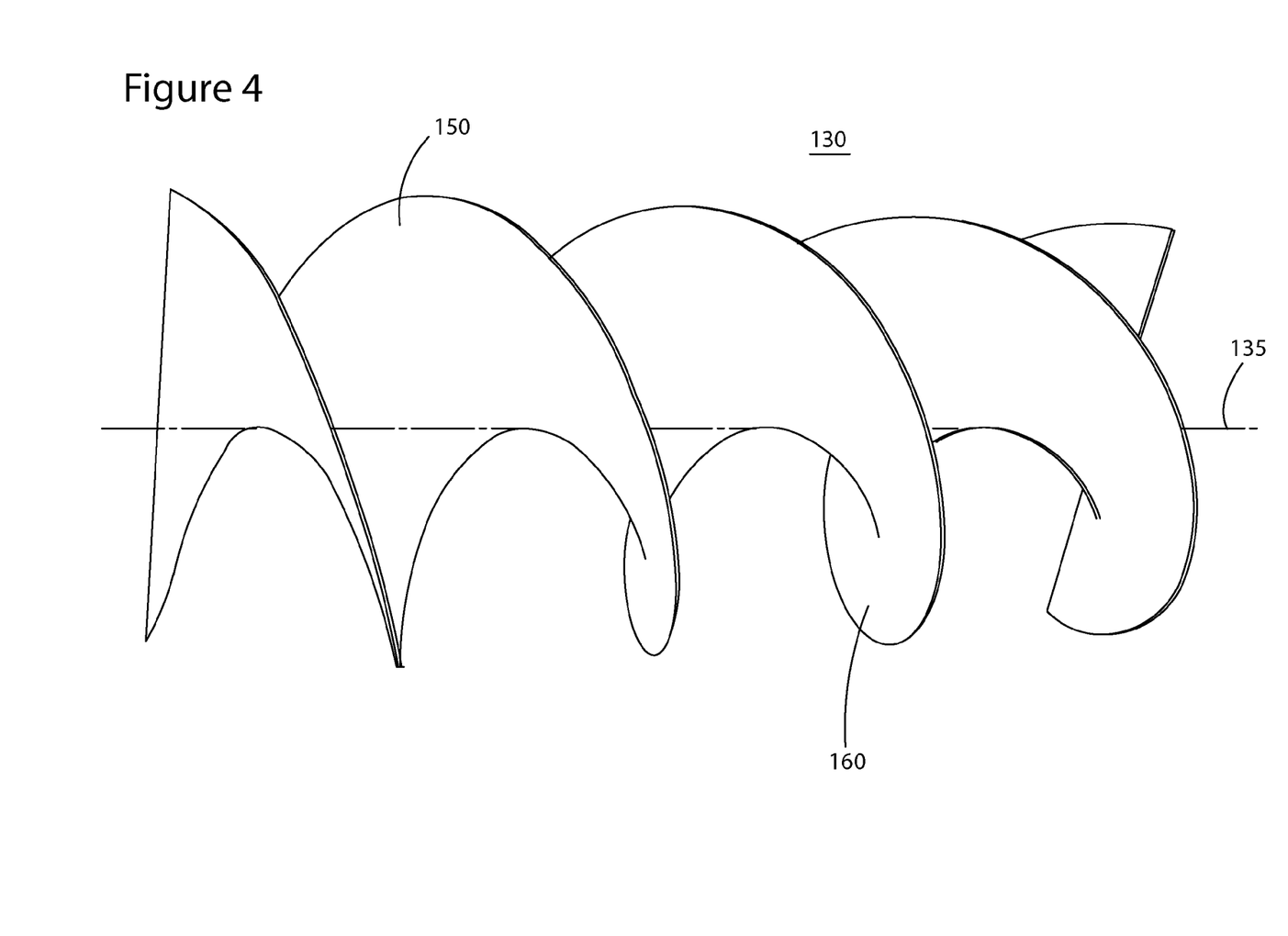
FIG. 4 is a schematic diagram of a helical blade according to an exemplary embodiment.

When viewed in the flow direction (e.g., at a 45° angle) at a level of the rotation axis 135, an area 150 of the helical blade 130 on one side of the rotation axis 135, is substantially larger than an area 160 of the helical blade 130 on another side of the rotation axis 135, as illustrated in FIG. 4.

Figure 5:
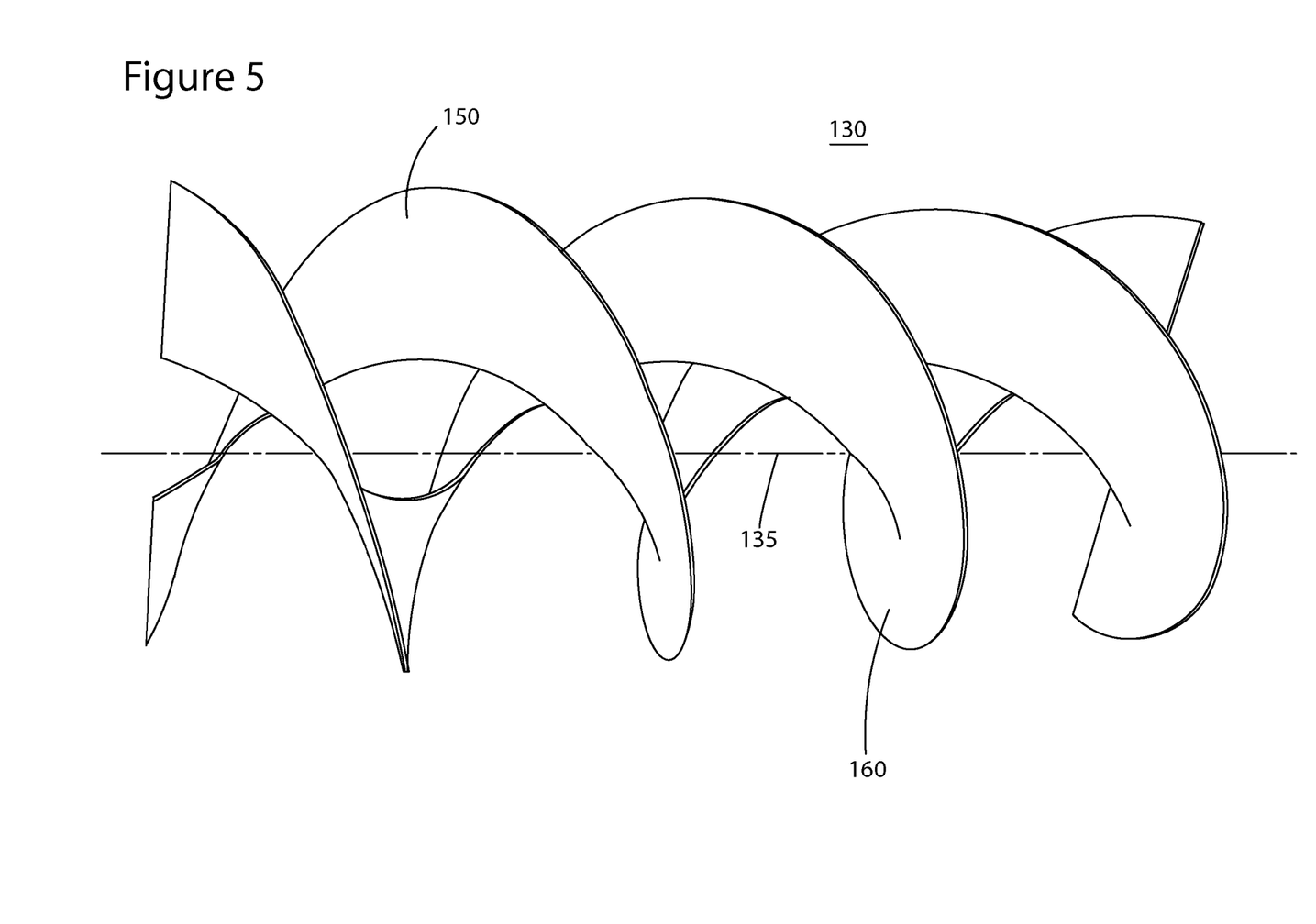
FIG. 5 is a schematic representation of a helical blade according to another exemplary embodiment.

In one embodiment, illustrated in FIG. 5, the helical blade 130 may have a hollow center, around the rotation axis 135 to improve the rotating efficiency due to the fluid flow. The rotating efficiency of a helical blade that rotates due to the fluid flow depends on a ratio between the area 150 of the helical blade exposed to the incoming fluid flow on one side of the rotation axis 135, and the area 160 of the helical blade exposed to the incoming fluid flow on the other side of the rotation axis 135. This ratio is larger for the hollow helical blade illustrated in FIG. 5 than for the non-hollow helical blade illustrated in FIG. 4. The helical blades are made of light and thin but rigid materials. Although FIGS. 4 and 5 refer to the helical blade 130, the same design may be used for the helical blade 130'.

The rotation speed of the helical blade is a result of the fluid moving at speeds that may vary at locations along the helical blade. When a spinner arm (e.g., 120 or 120' in FIG. 3) is deployed, a helical blade (e.g., 130 or 130') spans a predetermined length over plural locations at which the fluid may flow at different speeds. Therefore, the measured rotation speed of a helical blade represents an average effect of local fluid speed values. Thus, measuring the flow according to some of the embodiments has the advantage that the fluid flow estimated based on the helical blades rotation speeds, takes into consideration local variations, but their impact on the total flow value is averaged by taking into consideration the plural locations. In contrast, each of the six fluid sensors 10 of the spinner tool array 1 reflects a local fluid speed being measured along the fluid low, and therefore a local variation of the fluid speed at a fluid sensor location may have a disproportionate effect in the overall estimation of the fluid flow.

Figure 6:
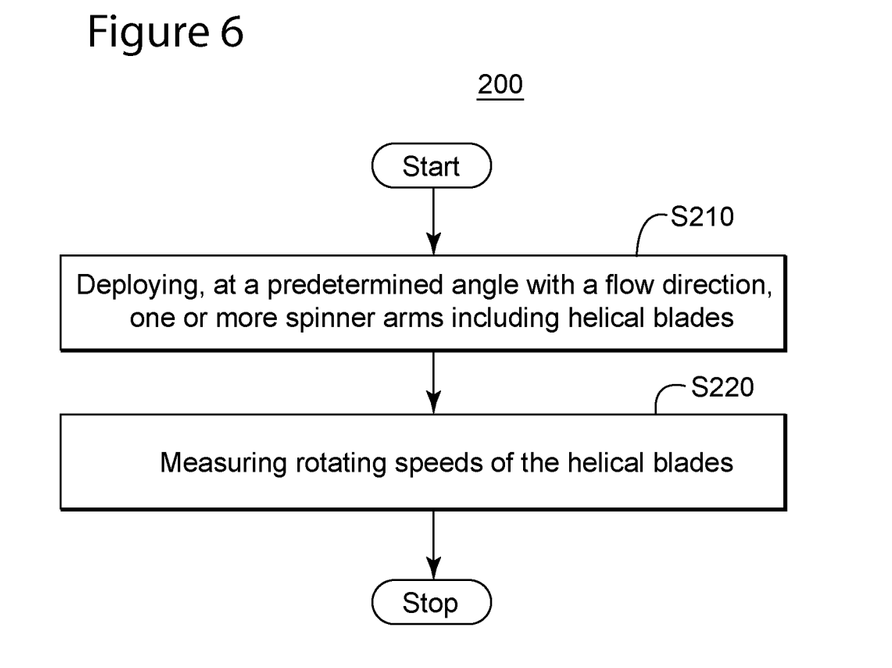
FIG. 6 is a flow chart of a method of measuring a fluid flow according to an exemplary embodiment.

FIG. 6 illustrates a method 200 of measuring a fluid flow according to an exemplary embodiment. The method 200 includes deploying at a predetermined angle with a flow direction, one or more spinner arms (e.g., 120, 120' in FIG. 3) including helical blades (e.g., 130, 130' in FIG. 3), each of the helical blades being configured to rotate around a rotation axis (e.g., 135, 135' in FIG. 3) at the respective predetermined angle, at S210. Further, the method includes measuring rotating speeds of the helical blades, at S220.

The method 200 may be performed with the apparatus 100 in FIG. 3, having spinner blades similar to the ones illustrated in illustrated in FIG. 4 or in FIG. 5.

The method 200 may further include, prior to the deploying, collapsing around a core the one or more spinner arms, and passing the collapsed spinner arms through a casing (i.e., a restriction) towards a flow measurement location. The method 200 may also include evaluating a fluid flow based on the measured rotating speeds.

Figure 7:
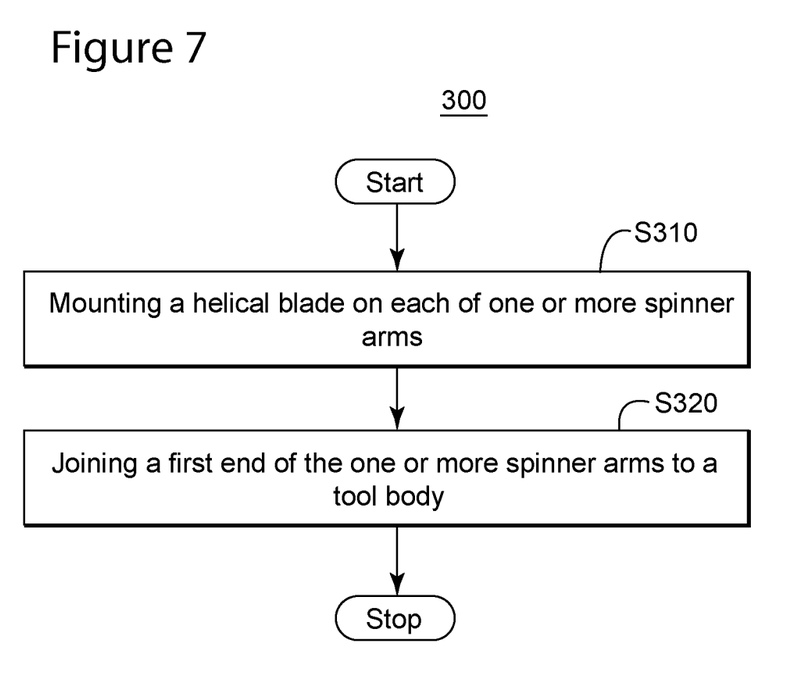
FIG. 7 is flow chart of a method of manufacturing a flowmeter according to an exemplary embodiment.

FIG. 7 illustrates a method 300 of manufacturing a flowmeter according to an exemplary embodiment. At S310, the method 300 includes mounting a helical blade (e.g., 130, 130' in FIG. 3) on each of one or more spinner arms (e.g., 120, 120' in FIG. 3), the helical blade (e.g., 130, 130' in FIG. 3) being able to rotate due to a fluid flowing (e.g., 127, 127' in FIG. 3) at one or more predetermined angles with a rotation axis (e.g., 135, 135' in FIG. 3) that extends along the respective spinner arm (e.g., 120, 120' in FIG. 3).

At S320, the method 300 further includes joining a first end (e.g., 124, 124' in FIG. 3) of the one or more spinner arms (e.g., 120, 120' in FIG. 3) to a tool body (e.g., 110 in FIG. 3), the one or more spinner arms (e.g., 120, 120' in FIG. 3) being able (i) to extend with a second end (e.g., 122, 122' in FIG. 3) away from the tool body, and (ii) to collapse with the second end (e.g., 124, 124' in FIG. 3) close to the tool body (e.g., 110 in FIG. 3). The mounting of the helical blade (e.g., 130, 130' in FIG. 3) may be performed to locate the helical blade closer to the second end (e.g., 122, 122' in FIG. 3) than to the first end (e.g., 124, 124' in FIG. 3) of a respective spinner arm (e.g., 120, 120' in FIG. 3).

The method 300 may further include mounting a sensor (e.g., 140, 140' in FIG. 3) configured to measure a rotation speed of the helical blade (e.g., 130, 130' in FIG. 3), on each of the one or more spinner arms (e.g., 120, 120' in FIG. 3). The mounting of the helical blade (e.g., 130, 130' in FIG. 3) may be performed to locate the helical blade closer to the second end (e.g., 122, 122' in FIG. 3) than to the first end (e.g., 124, 124' in FIG. 3) of the respective spinner arm (e.g., 120 or 120' in FIG. 3). The mounting of the sensor may performed to have the sensor (e.g., 140, 140' in FIG. 3) located outside an area of the helical blade (e.g., 130, 130' in FIG. 3).

The disclosed exemplary embodiments provide tools and methods for measuring a fluid flow. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A flowmeter, comprising:
    a tool body;
    one or more spinner arms configured to extend with a first end away from the tool body and having a second end joined to the tool body, when deployed to measure a fluid flow, wherein each of the one or more spinner arms has a longitudinal axis extending from the first end to the second end;
    a helical blade mounted on each of the spinner arms, the helical blade being configured to rotate around the longitudinal axis of the corresponding spinner arm due to a fluid flowing substantially parallel to a longitudinal axis of the tool body; and
    at least one sensor located on each of the one or more spinner arms, outside an area of the helical blade, the at least one sensor detecting a rotating speed of the helical blade.

2. The flowmeter of claim 1, wherein the helical blade is a double helix blade.

3. The flowmeter of claim 1, wherein the helical blade has a hollow center, around the rotation axis.

4. The flowmeter of claim 1, wherein the helical blade is located closer to the first end than to the second end of the spinner arm.

5. The flowmeter of claim 1, wherein the one or more spinner arms are configured to be deployed at angles of about 45° with the longitudinal axis of the tool body.

6. The flowmeter of claim 1, wherein the helical blade is configured to have an area on one side of the rotation axis substantially larger than an area on another side of the rotation axis in a plane perpendicular to the flow direction.

7. The flowmeter of claim 1, wherein the helical blade has a helical angle of about 45°.

8. The flowmeter of claim 1, wherein the helical blade has a diameter of about 10 mm.

9. The flowmeter of claim 1, wherein the helical blade has a length of about 50 mm.

10. The flowmeter of claim 1, wherein the one or more spinner arms are configured to collapse close to the tool body while transported towards a measurement location.

11. A method of measuring a fluid flow, comprising:
    deploying, at a predetermined angle with a flow direction, one or more spinner arms including helical blades, wherein each spinner arm includes a longitudinal axis, each of the helical blades being configured to rotate around the longitudinal axis of the corresponding spinner arm at the respective predetermined angle; and
    measuring rotating speeds of the helical blades;
        wherein, measuring the rotating speeds is performed using sensors located close to one end of the helical blades.

12. The method of claim 11, further comprising:
    prior to the deploying, collapsing the one or more spinner arms close to a central axis; and
    passing the collapsed spinner arms through a restriction towards a flow measurement location.

13. The method of claim 11, further comprises:
    transmitting the measured rotating speed wirelessly towards a data processing unit.

14. The method of claim 11, further comprises:
    transmitting the measured rotating speed via a cable towards a data processing unit.

15. The method of claim 11, further comprising:
    evaluating a fluid flow based on the measured rotating speeds.

16. The method of claim 11, wherein the predetermined angle is about 45°.

17. A method of manufacturing a flowmeter, comprising:
    mounting a helical blade on each of one or more spinner arms, the helical blade being able to rotate due to a fluid flowing at a predetermined angle with a rotation axis that extends along the spinner arm;
    joining a first end of the one or more spinner arms to a tool body, the one or more spinner arms being configured (i) to extend with a second end away from the tool body, and (ii) to collapse with the second end close to the tool body; and
    mounting a sensor to measure a rotating speed of the helical blade, on each of the one or more spinner arms.

18. The method of claim 17, wherein the mounting of the helical blade is performed to locate the helical blade closer to the second end than to the first end of a respective spinner arm, and the mounting of the sensor is performed to have the sensor located outside an area of the helical blade.

* * * * *